(12) United States Patent
Trainer et al.

(10) Patent No.: US 12,172,763 B2
(45) Date of Patent: Dec. 24, 2024

(54) ELECTRICAL POWER SYSTEM (71) Applicant: ROLLS-ROYCE plc, London (GB)

(72) Inventors: David R. Trainer, Derby (GB); Francisco Javier Chivite Zabalza, Stafford (GB); Mark Sweet, Chesterfield (GB); Gian Incerpi, Buckingham (GB)

(73) Assignee: Rolls-Royce PLC, London (GB)

( * ) Notice: Subject to any disclaimer, the term of this patent is extended or adjusted under 35 U.S.C. 154(b) by 7 days.

(21) Appl. No.: 18/333,873

(22) Filed: Jun. 13, 2023

(65) Prior Publication Data

US 2024/0002062 A1    Jan. 4, 2024

(30) Foreign Application Priority Data

Jul. 4, 2022   (GB) ...................................... 2209761

(51) Int. Cl.
*B64D 27/24*       (2024.01)
*B64D 27/10*       (2006.01)
(Continued)

(52) U.S. Cl.
CPC ............ *B64D 27/24* (2013.01); *B64D 27/10* (2013.01); *H02J 1/00* (2013.01); *H02M 7/219* (2013.01);
(Continued)

(58) Field of Classification Search
CPC ...... B64D 27/24; B64D 27/10; B64D 27/026; B64D 2221/00; H02J 1/00; H02M 7/219; H02P 9/02
(Continued)

(56) References Cited

U.S. PATENT DOCUMENTS 9,385,645 B2    7/2016  Pan et al.
9,963,095 B2 *  5/2018  Huang .................... F01D 15/10
(Continued)

FOREIGN PATENT DOCUMENTS

CA     2790958 A1    4/2013
CN   102119481 A    7/2011
(Continued)

OTHER PUBLICATIONS

European search report dated Nov. 24, 2023, issued in EP Patent Application No. 23177224.5.
(Continued)

*Primary Examiner* — Alfonso Perez Borroto (57) ABSTRACT

The disclosure relates to an electrical power system for connecting an electrical machine to first and second DC networks operating at different voltages. In an embodiment, an electrical power system comprises: an electrical machine having first, second, third and fourth windings; first, second, third and fourth AC:DC power electronics converters each connected to receive an input AC supply from the respective first, second, third and fourth windings, each AC:DC power electronics converter having first and second DC output terminals connecting the AC:DC power electronics converters to first, second and third DC supply output terminals, wherein the first and second windings are arranged to provide an AC supply to the respective first and second AC:DC power electronics converters in quadrature to each other and the third and fourth windings are arranged to provide an AC supply to the respective third and fourth AC:DC power electronics converters in quadrature to each other.

20 Claims, 11 Drawing Sheets (51) Int. Cl.
   *H02J 1/00* (2006.01)
   *H02M 7/219* (2006.01)
   *H02P 9/02* (2006.01)
   *B64D 27/02* (2006.01)

(52) U.S. Cl.
   CPC .............. *H02P 9/02* (2013.01); *B64D 27/026* (2024.01); *B64D 2221/00* (2013.01)

(58) Field of Classification Search
   USPC ........................................................ 307/9.1
   See application file for complete search history.

(56) References Cited

U.S. PATENT DOCUMENTS

| | | | | |
|---|---|---|---|---|
| 2006/0012179 | A1* | 1/2006 | Thomson | F02C 7/275 |
| | | | | 290/34 |
| 2006/0042267 | A1* | 3/2006 | Thompson | F01D 19/00 |
| | | | | 60/786 |
| 2010/0237733 | A1* | 9/2010 | Legros | H02J 3/02 |
| | | | | 310/112 |

FOREIGN PATENT DOCUMENTS

| | | |
|---|---|---|
| EP | 3832827 A1 | 6/2021 |
| EP | 3832872 A1 | 6/2021 |
| GB | 2589633 A | 6/2021 |
| GB | 2589634 A | 6/2021 |

OTHER PUBLICATIONS

Great Britain search report dated Dec. 13, 2022, issued in GB Patent Application No. 2209761.2.

\* cited by examiner

ELECTRICAL POWER SYSTEM

CROSS-REFERENCE TO RELATED APPLICATIONS

This specification is based upon and claims the benefit of priority from United Kingdom Patent Application No. 2209761.2, filed on 4 Jul. 2022, the entire contents of which are incorporated herein by reference.

BACKGROUND

Technical Field

This present disclosure relates to an electrical power system for connecting an electrical machine to first and second DC networks operating at different voltages.

Description of the Related Art

In aerospace, the more electric engine (MEE) and more electric aircraft (MEA) concepts are increasingly attractive due to their potential to reduce fuel consumption. For example, one known aircraft configuration includes electric machines in its engines which are operable as both motors and generators. This facilitates both generation of electrical power during flight and starting of the engine, allowing removal of the air-turbine starter and attendant bleed air ducting. One engine configuration for this known aircraft includes such electric machines coupled to the high-pressure spool of a twin-spool turbofan. Another includes such electric machines coupled to the intermediate-pressure spool of a triple-spool turbofan.

Current trends are tending to support an increase in the distribution voltage to facilitate higher power loads such as electrically driven propulsors, with a voltage level of $540V_{DC}$, or $+/-270V_{DC}$, being proposed. While current use of loads operating at $270V_{DC}$ continues, it may be beneficial to derive both voltage levels from a common gas turbine engine to enable current systems to continue to be used. Doing so can, however, result in additional complexity and weight if using multiple generators and converters.

Example electrical systems for connecting rotary electrical machines to two DC networks are disclosed in EP 3832827 A1 and EP 3832872 A1, in which combinations of AC:DC and DC:DC converter circuits are used to generate multiple DC outputs. Using additional DC:DC converter circuits, however, adds weight and complexity and increases electrical losses in transforming electrical power from an electrical machine to a DC network.

Thus, it is an object of the invention to provide an electrical system to facilitate more efficient transfer of power between an electrical machine and DC electrical networks operating at different voltages.

SUMMARY

According to a first aspect there is provided an electrical power system comprising:
- an electrical machine having first, second, third and fourth windings;
- first, second, third and fourth AC:DC power electronics converters each connected to receive an input AC supply from the respective first, second, third and fourth windings, each AC:DC power electronics converter having first and second DC output terminals, wherein:
  - first DC output terminals of the first and second AC:DC power electronics converters are connected to a first DC supply output terminal;
  - second DC output terminals of the first and second AC:DC power electronics converters are connected to a second DC supply output terminal;
  - first DC output terminals of the third and fourth AC:DC power electronics converters are connected to the second DC supply output terminal; and
  - second DC output terminals of the third and fourth AC:DC power electronics converters are connected to a third DC supply output terminal,
  - wherein the first and second windings are arranged to provide an AC supply to the respective first and second AC:DC power electronics converters in quadrature to each other and the third and fourth windings are arranged to provide an AC supply to the respective third and fourth AC:DC power electronics converters in quadrature to each other.

The electrical power system may further comprise a switching controller connected to provide switching signals to each of the first, second, third and fourth AC:DC power electronics converters.

The electrical power system may comprise a first DC distribution bus connected between the first and second DC supply output terminals for connection to a first DC load and a second DC distribution bus connected between the first and third DC supply output terminals for connection to a second DC load.

The electrical power system may comprise a third DC distribution bus connected between the second and third DC supply output terminals for connection to a third DC load.

The first, second third and fourth AC:DC power electronics converters may be each configured as H-bridge converters.

The first, second third and fourth AC:DC power electronics converters may be each configured to provide an output power of up to 100 kW.

The first and second AC:DC power electronics converters may be configured to provide an output power of over twice that of the third and fourth AC:DC power electronics converters.

The first and second AC:DC power electronics converters may be configured to provide an output power of three times that of the third and fourth AC:DC power electronics converters.

According to a first aspect there is provided an electrical power system comprising:
- an electrical machine having first and second pluralities of windings;
- a first AC:DC power electronics converter connected to the first plurality of windings;
- a second AC:DC power electronics converter connected to the second plurality of windings;
- a switching controller configured to provide switching signals to the first and second AC:DC power electronics converters to provide a first DC output supply across first and second DC output terminals of the first AC:DC power electronics converter and a second DC output supply across first and second DC output terminals of the second AC:DC power electronics converter;
- a first DC distribution bus connected across the first and second DC output terminals of the first AC:DC power electronics converter for connection to a first DC load;

a second DC distribution bus connected across the first and second DC output terminals of the second AC:DC power electronics converter for connection to a second DC load; and a third DC distribution bus connected across the first DC output terminal of the first AC:DC power electronics converter and the second DC output terminal of the second AC:DC power electronics converter for connection to a third DC load.

The first and second AC:DC power electronics converters may be each configured to provide an output power of up to 100 kW.

The first and second pluralities of windings may be provided on a common stator of the electrical machine.

The first and second pluralities of windings may each consist of three windings.

The electrical power system may further comprise:
the first load connected across the first DC distribution bus;
the second load connected across the second DC distribution bus; and
the third load connected across the third DC distribution bus.

The second DC output terminal of the first AC:DC power electronics converter and the first DC output terminal of the second AC:DC power electronics converter may be connected to a ground terminal.

According to a third aspect there is provided an aircraft power and propulsion system comprising:
a gas turbine engine; and
an electrical power system according to the first or second aspects,
wherein the electrical machine of the electrical power system is mechanically coupled with a spool of the gas turbine engine.

According to a third aspect there is provided an aircraft comprising the power and propulsion system according to the second aspect. The aircraft may be a hybrid electric aircraft.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which.

DETAILED DESCRIPTION

Figure 1:
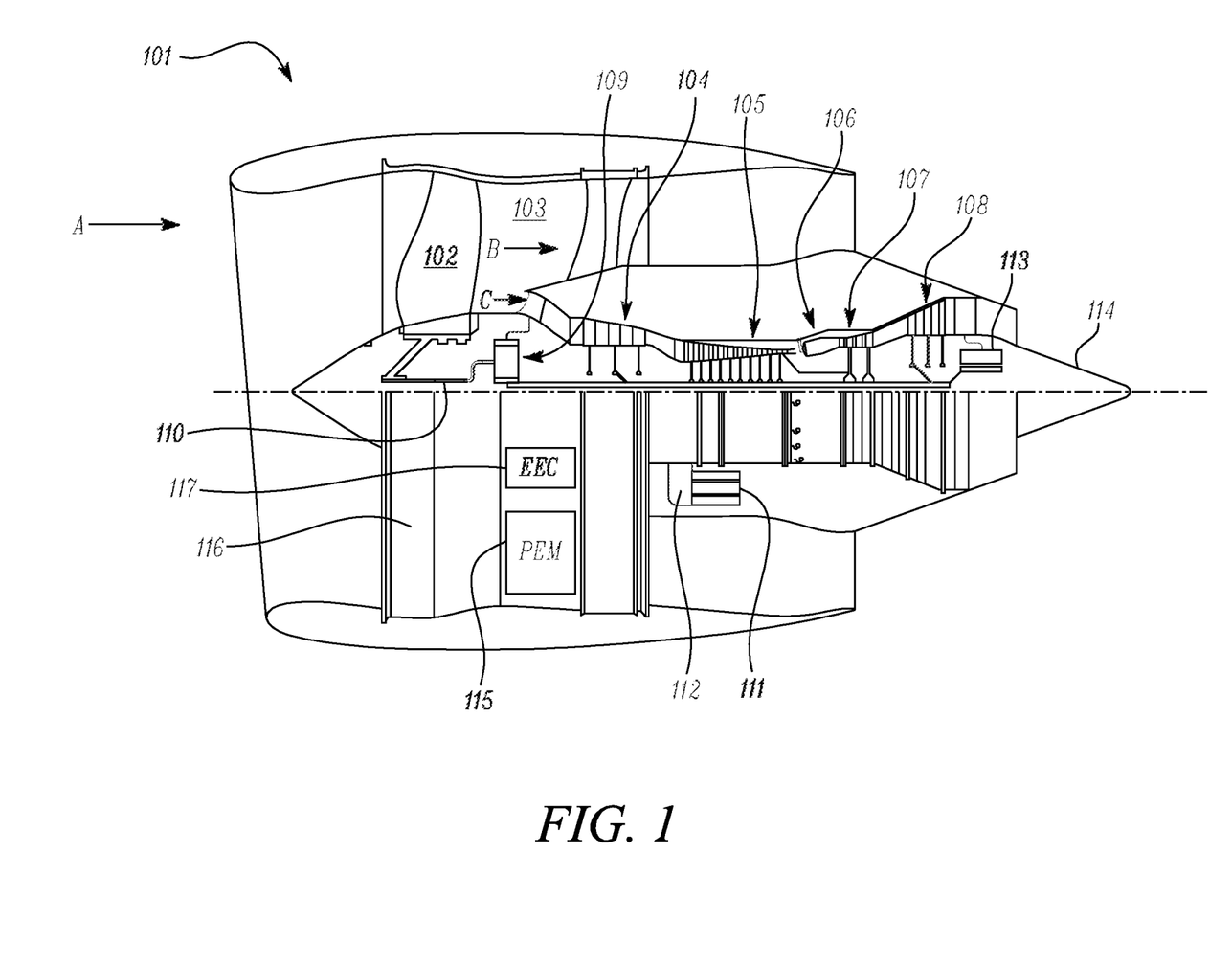
FIG. 1 shows a general arrangement of a turbofan engine for an aircraft.

FIG. 1

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of FIG. 1 comprises one or more rotary electrical machines, generally capable of operating both as a motor and as a generator. The number and arrangement of the rotary electrical machines will depend to some extent on the desired functionality. Some embodiments of the engine 101 include a single rotary electrical machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electrical machine 111 coupled with the high pressure spool and a second rotary electrical machine 113 coupled with the low pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electrical machine 111 is driven by the high-pressure spool by a core-mounted accessory drive 112 of conventional configuration. In alternative embodiments, the first electrical machine 111 may be mounted coaxially with the turbomachinery in the engine 101. For example, the first electrical machine 111 may be mounted axially in line with the duct between the low- and high-pressure compressors 104 and 105. In FIG. 1, the second electrical machine 113 is mounted in the tail cone 114 of the engine 101 coaxially with the turbomachinery and is coupled to the low-pressure turbine 108. In alternative embodiments, the second rotary electrical machine 113 may be located axially in line with low-pressure compressor 104, which may adopt a bladed disc or bladed drum configuration to provide space for the second rotary electrical machine 113. It will of course be appreciated by those skilled in the art that any other suitable location for the first and (if present) second electrical machines may be adopted.

The first and second electrical machines 111, 113 are connected with power electronics. Extraction of power from or application of power to the electrical machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electrical machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e., both of the core gas turbine and the first and second electrical machines 111 and 113. In this way, the EEC 117 may holistically respond to both thrust demand and electrical power demand.

The one or more rotary electrical machines 111, 113 and the power electronics 115 may be configured to output to or receive electric power from one, two or more dc busses. The dc busses allow for the distribution of electrical power to other engine electrical loads and to electrical loads on the airframe.

Those skilled in the art will appreciate that the gas turbine engine 101 described above may be regarded as a 'more electric' gas turbine engine because of the increased role of the electrical machines 111, 113 compared with those of conventional gas turbines.

Figure 2A:
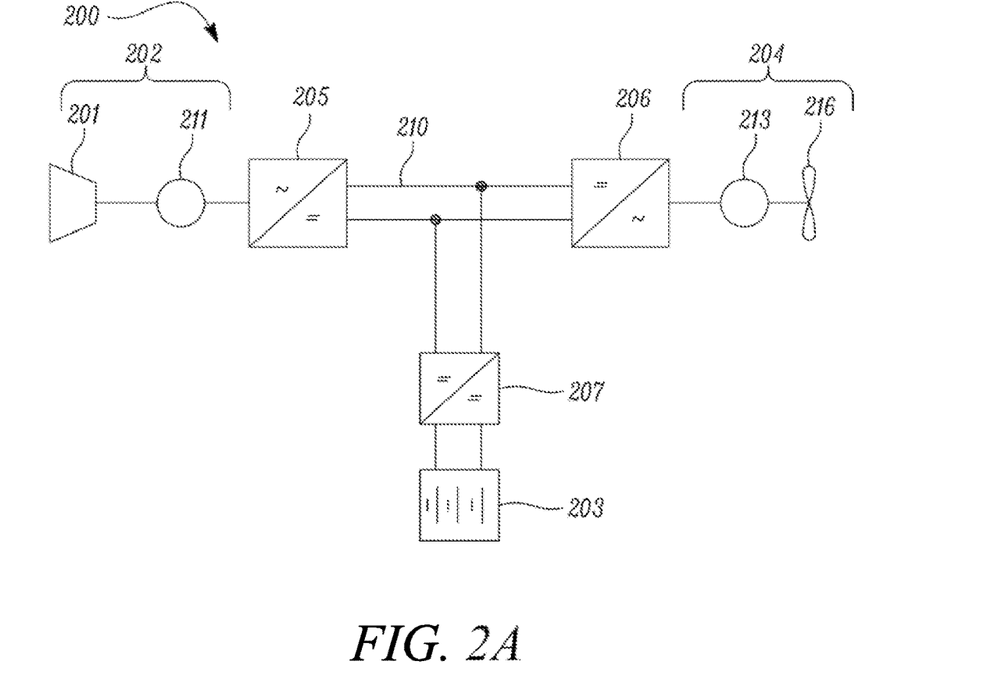
FIG. 2A is a schematic illustration of a hybrid electric aircraft propulsion system.
Figure 2B:
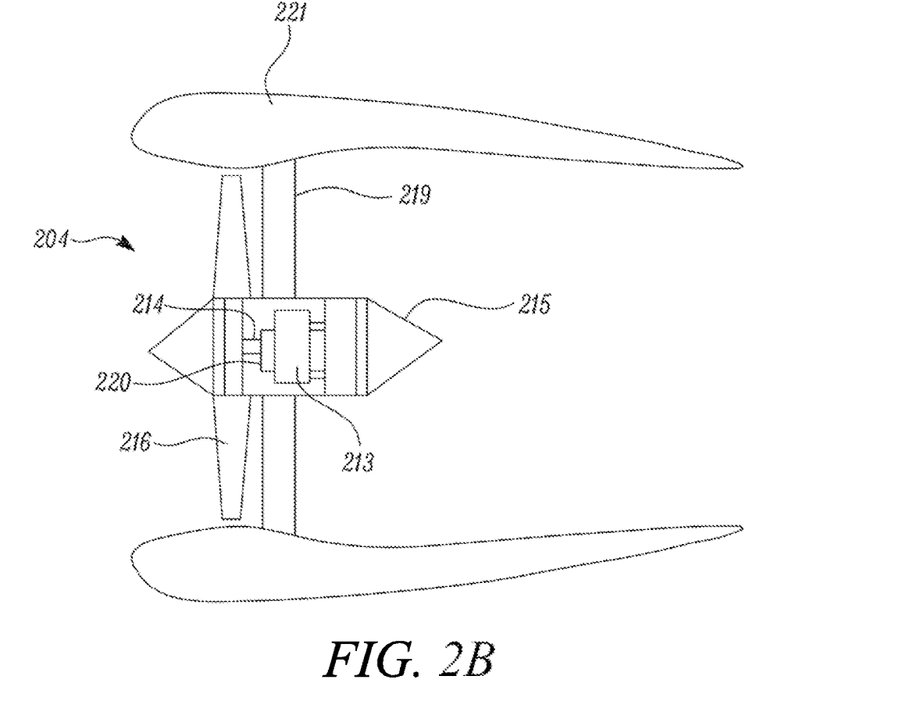
FIG. 2B illustrates an electrically powered propulsor such as may be used in a hybrid electric propulsion system.

FIGS. 2A and 2B

FIG. 2A illustrates an exemplary propulsion system 200 of a hybrid electric aircraft. The propulsion system 200 includes a generator set 202 comprising a gas turbine engine 201 and electrical generator 211, and a battery pack 203. Both the generator set 202 and the battery pack 203 are used as energy sources to power a motor-driven propulsor 204, an example of which is shown in FIG. 2B.

The illustrated propulsion system 200 further comprises an AC/DC converter 205, a dc distribution bus 210, a DC/AC converter 206 and a DC/DC converter 207. It will be appreciated that whilst one generator set 202 and one propulsor 204 are illustrated in this example, a propulsion system 200 may include more than one generator set 202 and/or one or more propulsor 204.

A shaft or spool of the engine 201 is coupled to and drives the rotation of a shaft of the generator 211 which thereby produces alternating current. The AC/DC converter 205, which faces the generator 211, converts the alternating current into direct current which is fed to various electrical systems and loads via the dc distribution bus 210. These electrical systems include non-propulsive loads (not shown in FIG. 2A) and the motor-driven propulsor 204, which comprises a motor 213 which drives a propulsor 204 via the DC/AC converter 206.

The battery pack 203, which may be made up of a number of battery modules connected in series and/or parallel, is connected to the dc distribution bus 210 via the DC/DC converter 207. The DC/DC converter 207 converts between a voltage of the battery pack 203 and a voltage of the dc distribution bus 210. In this way, the battery pack 203 can replace or supplement the power provided by the generator set 202 (by discharging and thereby feeding the DC distribution bus 210) or can be charged using the power provided by the generator set 202 (by being fed by the dc distribution bus 210).

Referring to FIG. 2B, in this example the propulsor 204 takes the form of a ducted fan. The fan 216 is enclosed within a fan duct 219 defined within a nacelle 221 and is mounted to a core nacelle 215. The fan 216 is driven by the electrical machine 213 via a drive shaft 214, both of which may also be thought of as components of the propulsor 204. In this embodiment a gearbox 220 is provided between the electrical machine 213 and the drive shaft 214.

The electrical machine 213 is supplied with electric power from a power source, for example the generator set 202 and/or the battery 203 via the dc bus 210. The electrical machine 213 of the propulsor, and indeed the electrical machine 211 of the generator set 202, may be of any suitable type, for example of the permanent magnet synchronous type.

Those skilled in the art will recognise the propulsion system 200 of FIGS. 2A-B to be of the series hybrid type.

Other hybrid electric propulsion systems are of the parallel type, while still others are of the turboelectric type or have features of more than one type. The configuration of the more electric engine 101 of FIG. 1 may be considered similar to a parallel hybrid system, with the main distinction being the roles of the electrical machines. For example, the electrical machines of a more electric engine are generally only used in motor mode to start the engine and to improve engine operability, whereas the electric machines of a parallel hybrid propulsion system are used to motor the spools to meaningfully add to the amount of propulsive thrust produced by the turbomachinery.

Figure 3:
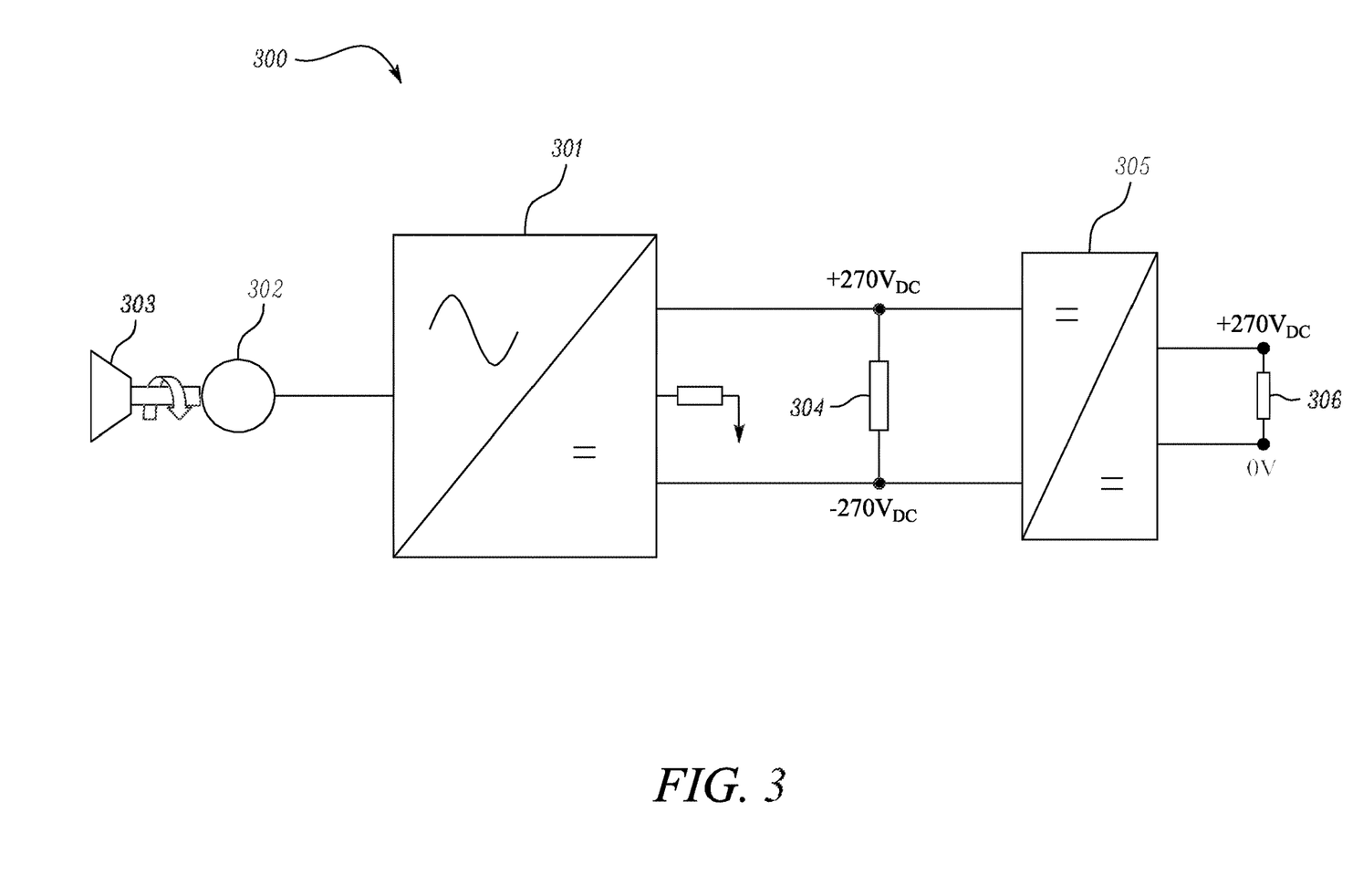
FIG. 3 is a schematic diagram of an example electrical power system providing first and second DC output supplies.

FIG. 3

FIG. 3 is a schematic diagram illustrating an electrical power system 300 configured to provide first and second DC supplies, in this example providing a first DC supply at $540V_{DC}$ (or +/-$270V_{DC}$) and a second DC supply at $270V_{DC}$. The first DC supply is provided by an AC:DC converter 301, which converts an AC supply provided by an electrical machine 302 driven by a gas turbine 303, the first DC supply connected across a first load 304. The second supply is provided by a DC:DC converter 305, which converts the first DC supply to the lower second DC supply. The second DC supply is connected across a second load 306. To provide each of the loads 304, 306 with the same power, the AC:DC converter 301 needs to be rated at twice this power, for example with the loads 304, 306 rated at 100 kW the AC:DC converter needs to be rated at 200 kW and the DC:DC converter rated at 100 kW. The total rating of the power converters 301, 305 therefore needs to be 300 kW to supply a combined load of 200 kW.

Figure 4:
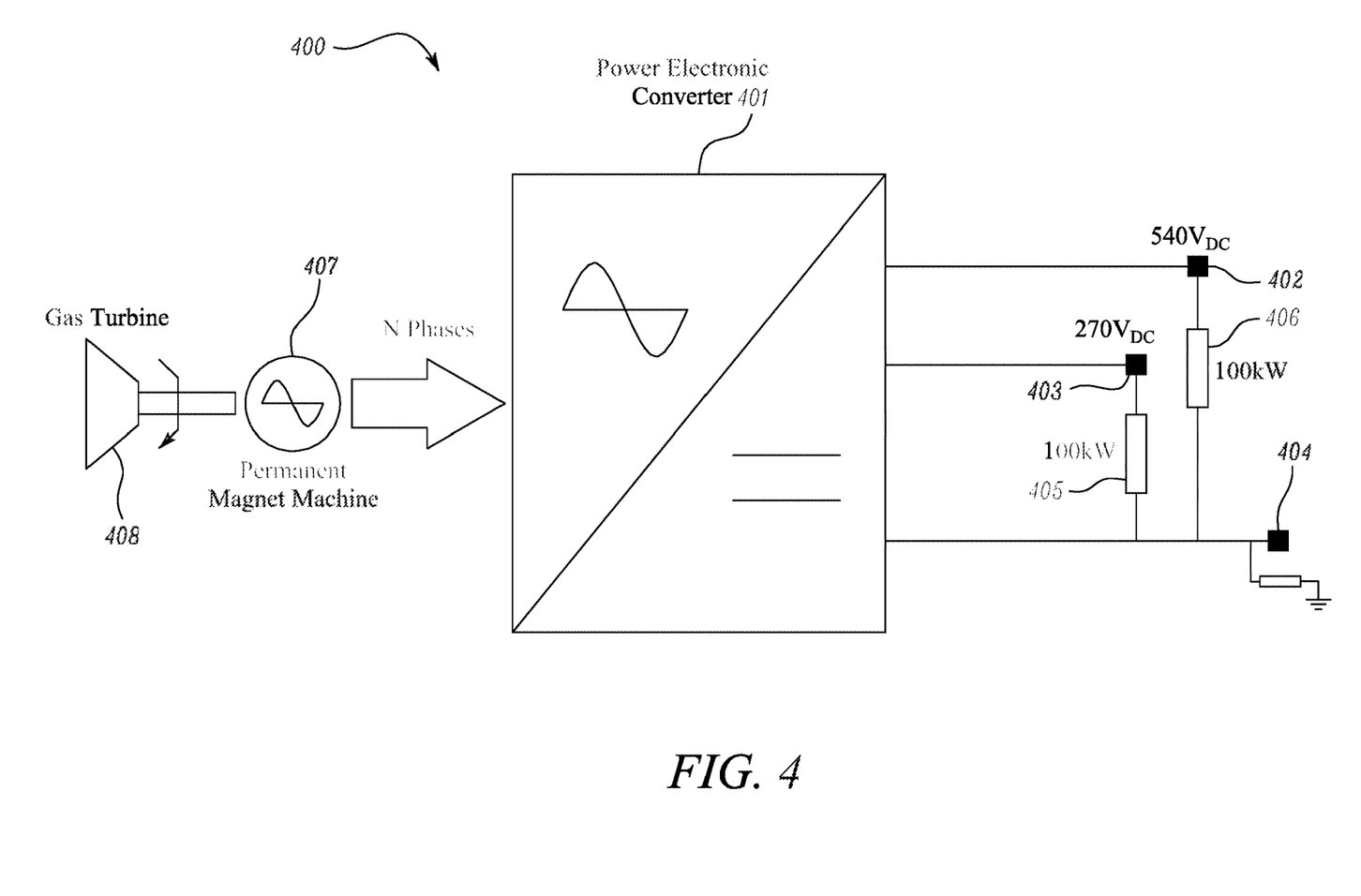
FIG. 4 is a schematic diagram of an example electrical power system using first and second power electronics converters to provide a DC output supply from a common electrical machine.

FIG. 4

FIG. 4 is a schematic diagram illustrating an example electrical power system 400 comprising an AC:DC power electronics converter 401 arranged to provide first and second DC output supplies 402, 403 relative to a common ground 404 across respective first and second loads 405, 406. Example values for the first and second DC output supply levels are 540V and 270V, with both loads 405, 406 rated at 100 kW. The AC:DC power electronics converter 401 is provided an AC supply by an N-phase electrical machine 407 driven by a gas turbine 408, where the number of phase N is two or more.

Figure 5:
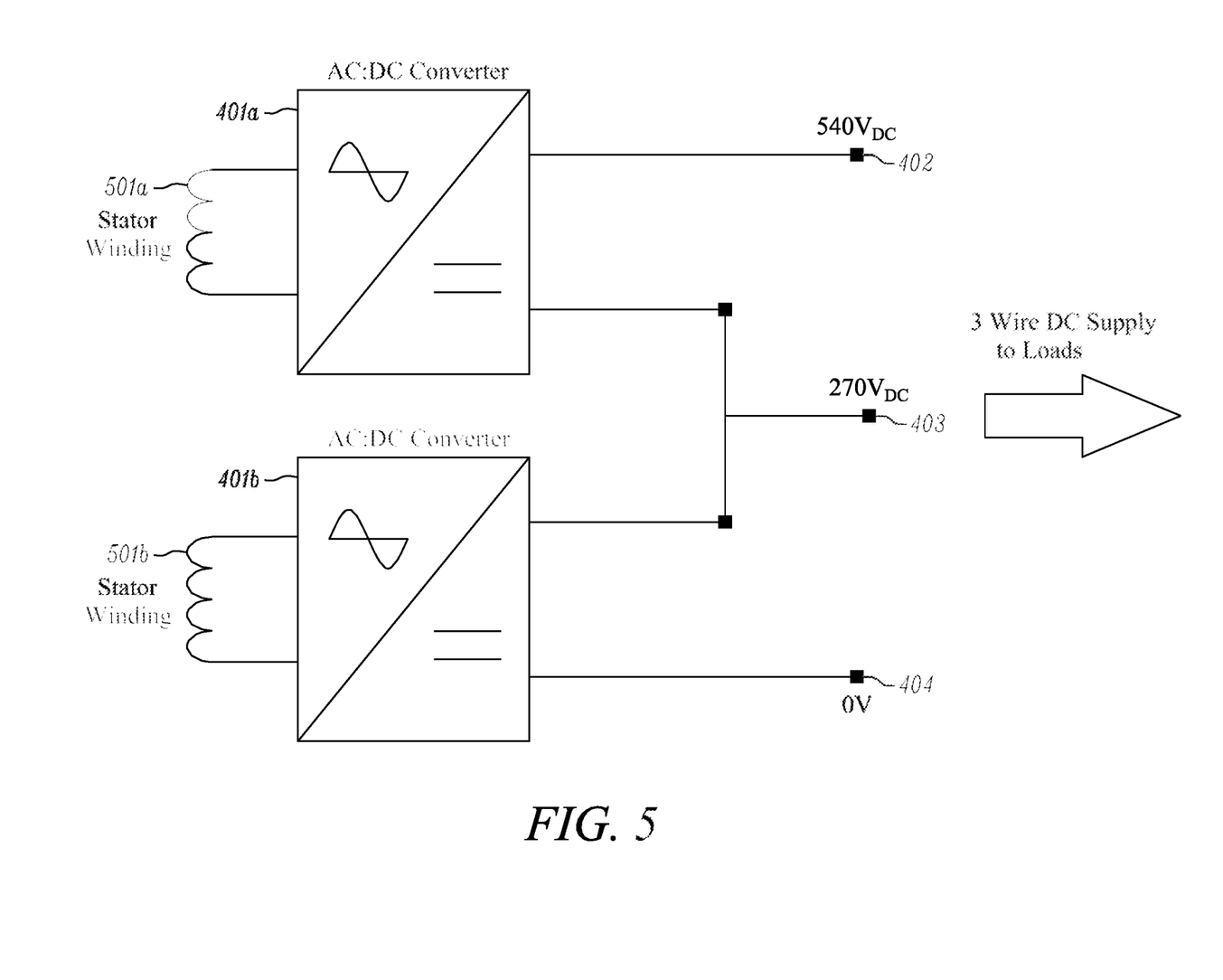
FIG. 5 is a schematic diagram of an example electrical power system using first and second power electronics converters to provide first and second DC output supplies from a common electrical machine.

FIG. 5

FIG. 5 illustrates an arrangement of the AC:DC power electronics converter 401 of FIG. 4, in which the converter 401 comprises first and second AC:DC power electronics converters 401a, 401b. Both AC:DC power electronics converters 401a, 401b are arranged to convert an input AC supply from a respective winding 501a, 501b of the electrical machine 407 to a DC output supply voltage. In this example, the first DC output supply 402 is provided by a series arrangement of the outputs from the first and second power electronics converters 401a, 401b, and the second DC output supply 403 is provided by the output from the second AC:DC power electronics converter 401b. By "stacking" the AC: DC converters 401a, 401b, a three terminal output is provided that is able to satisfy the power requirements of the output loads 405, 406. This arrangement, however, requires isolation between the windings 501a, 501b on the AC side to prevent circulation currents. This may be achieved by using separated single phase windings or by using multiple sets of three-phase stator windings within the electrical machine.

Figure 6:
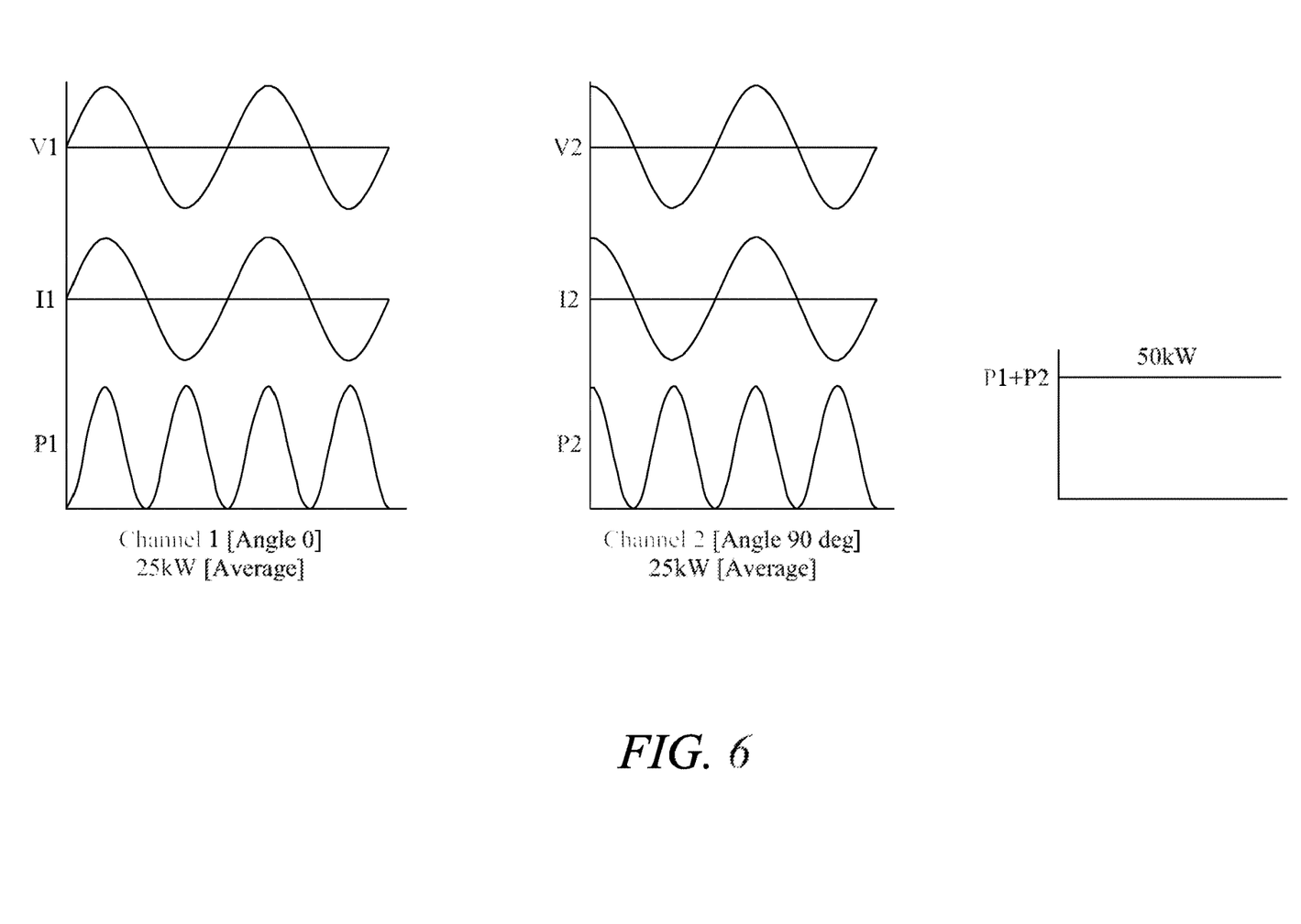
FIG. 6 is a schematic diagram illustrating voltage, current and power outputs from first and second channels of an electrical machine.

FIG. 6

The use of single phase windings to provide input AC power for the converters 401a, 401b results in a problem due to the effects of second harmonic power oscillations in each phase which, in normal three-phase systems would cancel out. Providing power to two output loads at differing voltage levels will also lead to differing amounts of average and oscillating power in each of the phases.

FIG. 6 illustrates how sinusoidal voltage and current in a single phase electrical power system leads to a second harmonic oscillating power component. An example is given of two channels, Channel 1 and Channel 2, each providing an average output power of 25 kW. Considering the voltage and current levels V1, I1 in Channel 1 in FIG. 6, the power P1 output by Channel 1 oscillates at twice the frequency of the voltage and current. Similarly for Channel 2, the output power P2 oscillates at twice the frequency of the voltage V2 and current 12 for Channel 2. By arranging the two phases to operate 90 electrical degrees apart at their fundamental frequency, and by maintaining equal loading of two phases, the second harmonic power oscillations can be made to cancel, such that the resulting total power output P1+P2 is a constant 50 kW.

These second harmonic power oscillations manifest themselves in the mechanical system driving the shaft of the generator as changes in the speed and/or torque, given that the input mechanical power is equal to speed multiplied by torque. Gas turbine driven electrical generators tend to operate at a fixed speed and so the second harmonic power oscillations will create associated second harmonic torque oscillations at the driving shaft. Neither speed nor torque oscillations are desirable. The arrangements described herein aim to achieve a 3 wire DC electrical generation and distribution system in which such second harmonic power oscillations are cancelled at the mechanical side of the system.

Figure 7:
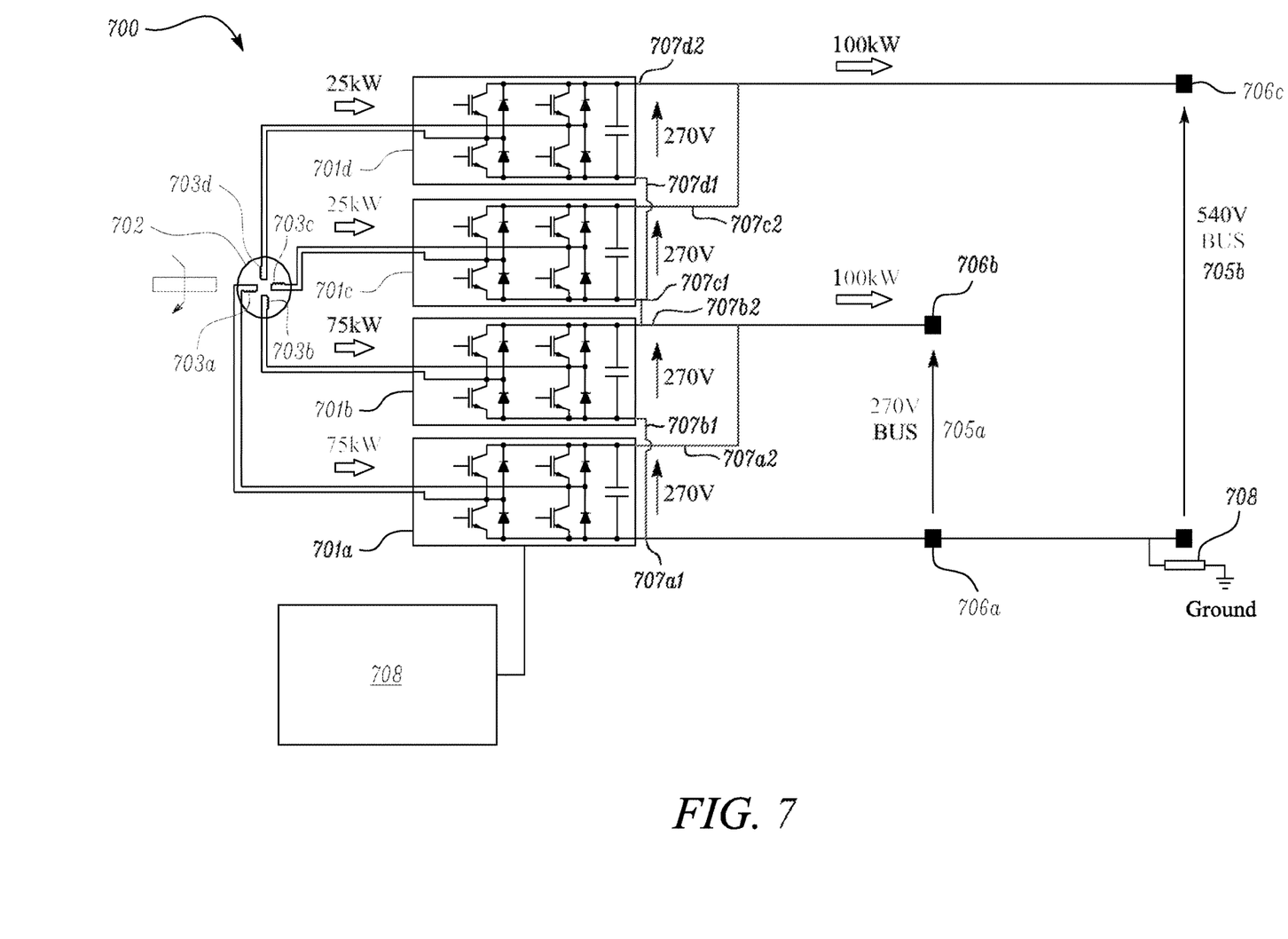
FIG. 7 is a schematic diagram of an example electrical power system with four power electronics converters connected to corresponding sets of windings on an electrical machine.

FIG. 7

FIG. 7 illustrates an electrical power system 700 comprising a stacked AC:DC power electronics converter arrangement supplied with AC power by an electrical machine 702. The power electronics converter arrangement is configured to provide DC output supplies to first and second DC distribution buses 705a, 705b via three DC supply output terminals 706a-c. A first DC supply output terminal 706a in this example is a common, or ground, terminal. The second DC supply output terminal 706b is at a first voltage level relative to the first DC supply output terminal 706a, in this case 270V, and the third DC supply output terminal 706c is at a second voltage level, in this case 540V, relative to the first DC supply output terminal 706a. Due to the arrangement of AC:DC power electronics converters 701a-d, the second voltage level is nominally twice that of the first voltage level.

The first, second, third and fourth AC:DC power electronics converters 701a-d are each connected to receive an input AC supply from a respective one of the first, second, third and fourth windings 703a-d of the electrical machine 702. Each AC:DC power electronics converter 701a-d has first and second DC output terminals 707a1, 707a2, 707b1, 707b2, 707c1, 707c2, 707d1, 707d2. The first DC output terminals 707a1, 707b1 of the first and second AC:DC power electronics converters 701a, 701b are connected to the first DC supply output terminal 706a. The second DC output terminals 707a2, 707b2 of the first and second AC:DC power electronics converters 701a, 701b are connected to the second DC supply output terminal 706b. The first DC output terminals 707c1, 707d1 of the third and fourth AC:DC power electronics converters 701c, 701d are connected to the second DC supply output terminal 706b. The second DC output terminals 707c2, 707d2 of the third and fourth AC:DC power electronics converters 701c, 701d are connected to the third DC supply output terminal 706c.

Each of the AC:DC power electronics converters 701a-d in this example is configured as an H-bridge converter. Control of the converters 701a-d is provided by a switching controller 708, which is configured to provide switching signals to each of the converters 701a-d.

The first and second windings 703a, 703b are arranged to provide an AC supply to the respective first and second AC:DC power electronics converters 701a, 701b in quadrature to each other. Similarly, the third and fourth windings 703a, 703b are arranged to provide an AC supply to the respective third and fourth AC:DC power electronics converters 701a, 701b in quadrature to each other. As described above in relation to FIG. 6, this results in the second harmonic component of the power outputs from each pair of converters, i.e., a first pair of the first and second converters 701a, 701b and a second pair of the third and fourth converters 701c, 701d, cancelling out.

The first and second converters 701a, 701b may have different power ratings to the third and fourth converters 701c, 701d. In the illustrated example, the first and second converters 701a, 701b are rated at 75 kW, while the third and fourth converters 701c, 701d are rated at 25 kW. The windings 703a-d may differ accordingly. This difference in power rating is explained by considering the DC side of the converters 707a-d. The first and second converters conduct current associated with both the first 270 VDC load and second 540 VDC load, whereas the third and fourth converters 701c, 701d only conduct the current associated with the second 540 VDC load. In combination, the system 700 is able to provide the same power output, in this example 100 kW, to each of the first and second DC distribution buses 705a, 705b. In a general aspect therefore, the first and second converters 701, 701b may have a higher power rating than the third and fourth converters 701c, 701d, and in particular example may have a power rating of around three times that of the third and fourth converters 701c, 701d.

The second harmonic power oscillations will cancel under all loading conditions on the first and second DC distribution buses 705a, 705b. For example, if the load on the second bus 705b is reduced to zero, the first and second converters 701a, 701b would each then conduct 50 kW of power but with the second harmonic oscillating components still equal and cancelling each other. Variations in output loads from the first and second distribution buses 705a, 705b can therefore be accommodated while still allowing the second harmonic power output components to be cancelled.

Figure 8:
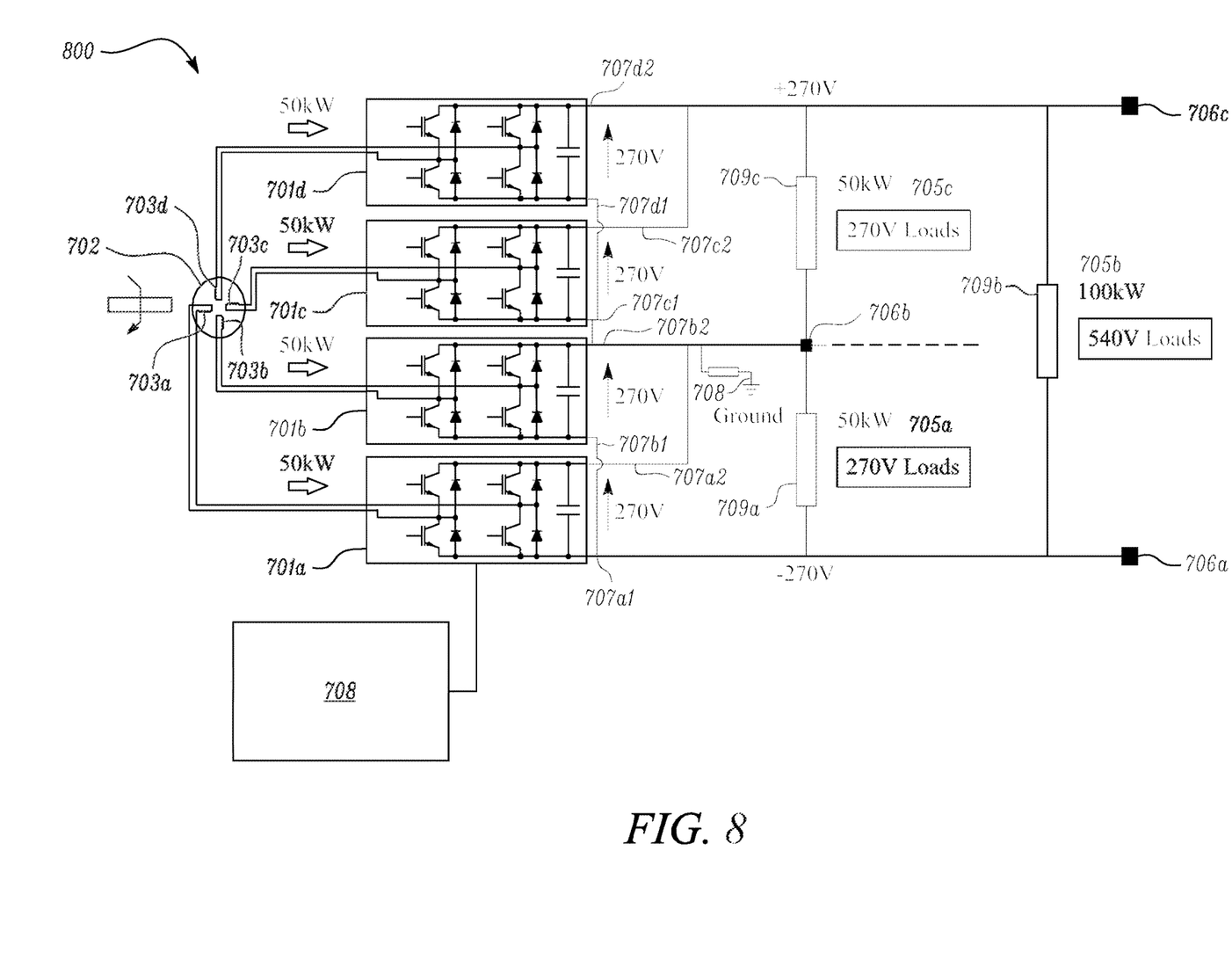
FIG. 8 is a schematic diagram of an alternative example electrical power system with four power electronics converters connected to corresponding sets of windings on an electrical machine.

FIG. 8

In FIG. 7 a ground connection 708 is connected to the first DC supply output terminal 706a. In an alternative arrangement, illustrated in FIG. 8, the ground connection may instead be made with the second DC supply output terminal 706b. This enables the system 800 to be operated such that a third DC distribution bus 705c is connected between the second and third DC supply output terminals for connection to a third DC load 709c. This arrangement also reduces stress on the insulation. As with the example in FIG. 7, a first DC load 709a is connected across the first DC distribution bus 705a and a second DC load 709b is connected across the second DC distribution bus 705b. In this example, the converters 701a-d may all have a similar power rating, since any variation in power drawn by the loads 709a-c can be made to affect the converters 701a-d equally. This arrangement may also require dynamic scheduling of power loads drawn such that the power drawn by the low voltage loads 709a, 709c remains similar.

Figure 9:
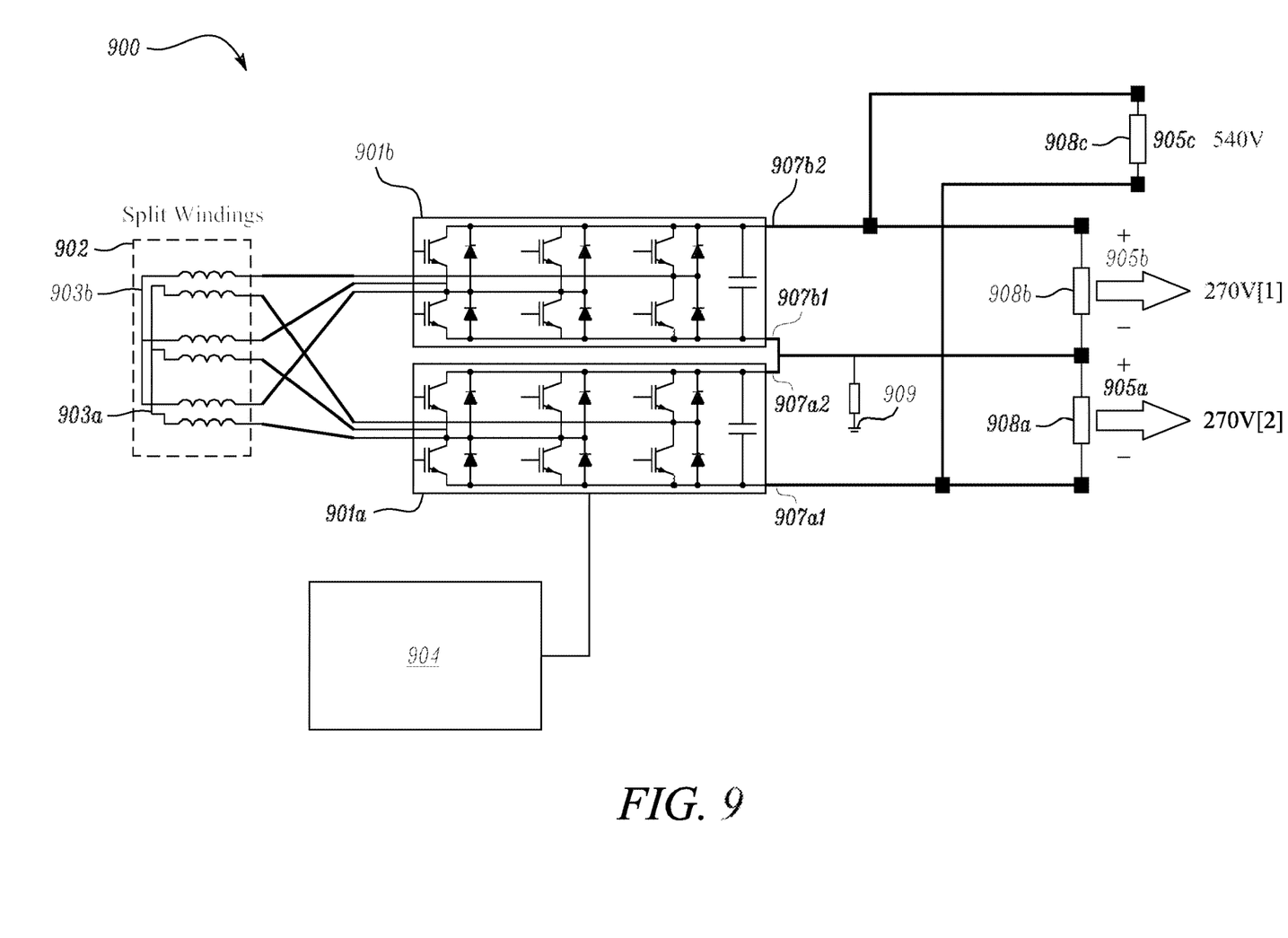
FIG. 9 is a schematic diagram of a further alternative electrical power system having two power electronics converters connected to a three phase electrical machine.

FIG. 9

The arrangements described above relate to a number of individual single phase generator windings and H-bridge converters suitably combined to cancel the second harmonic power oscillations at the connection to the DC network. Three-phase generator windings in combination with associated converters are also able to cancel such second harmonic power oscillations because the three phases operate 120 electrical degrees apart and, when added together, result in cancellation provided each phase is equally loaded.

FIG. 9 illustrates how a three wire DC supply distribution system can also be provided by stacking two three phase converters. The electrical power system 900 comprises an electrical machine 902 having first and second pluralities of windings 903a, 903b. In this example, the electrical machine has two three-phase winding sets. Each set of windings 903a, 903b is connected in a star arrangement to a respective one of a first and second AC:DC power electronics converter 901a, 901b, which are each configured to convert the three-phase AC input supply from the electrical machine 902 to a DC output supply under control of a switching controller 904 that is configured to provide switching signals to the first and second AC:DC power electronics converters 901a, 901b.

A first DC output supply is provided across the first and second DC output terminals 907a1, 907a2 of the first AC:DC power electronics converter 901a. A second DC output supply is provided across the first and second DC output terminals 907b1, 907b2 of the second AC:DC power electronics converter 901b. A first DC distribution bus 905a is connected across the first and second DC output terminals 907a1, 907a2 of the first AC:DC power electronics converter 901a for connection to a first DC load 908a. A second DC distribution bus 905b is connected across the first and second DC output terminals 907b1, 907b2 of the second AC:DC power electronics converter 901b for connection to a second DC load 908b. A third DC distribution bus 905c is connected across the first DC output terminal 907a1 of the first AC:DC power electronics converter 901a and the second DC output terminal 907b2 of the second AC:DC power electronics converter 901b for connection to a third DC load 908c.

A ground connection 909 is connected to the second DC output terminal 907a2 of the first converter 901a and the first DC output terminal 907b1 of the second converter 901b.

As with the examples described above, the DC supply voltage on the third distribution bus may be 540V, while the DC supply voltage on the first and second distribution buses may be 270V.

Given that the converters 901a, 901b are connected in series on their DC sides, it is necessary to provide isolation between the two 3-phase sets of generator windings. This can be achieved using a dual wound machine design as shown in FIG. 9. Generation could alternatively be achieved using two separate "tandem" machines connected by a common rotor, which would in effect operate as a single electrical machine. As discussed above, splitting the 270V loads such that they are distributed nominally equally across the 3 wire supply has the benefit of equalising the current/ loading in all machine stator windings.

An advantage of the arrangement shown in FIG. 9 is that further DC:DC converters are not required, as in EP 3832827 A1 and EP 3832872 A1, because the lower voltage load is shared between the first and second electrical loads 908a, 908b, allowing the converters 901a, 901b to operate in the same way as for a single higher voltage load. In practice, dynamic sharing of electrical loads will be required between the first and second loads 908a, 908b to ensure these loads are generally similar. This has the advantage of minimising the power rating of each phase of the generator system, i.e., the electrical machine, and maintains thermal balance between the electrical machine 902 and the converters 901a, 901b.

A number of phases for each set of windings 903a, 903b other than three may be provided on the electrical machine 902, provided they can load appropriately and positioned at relative fundamental frequency phase angles such that the second harmonic vectors sum to zero.

Figure 10:
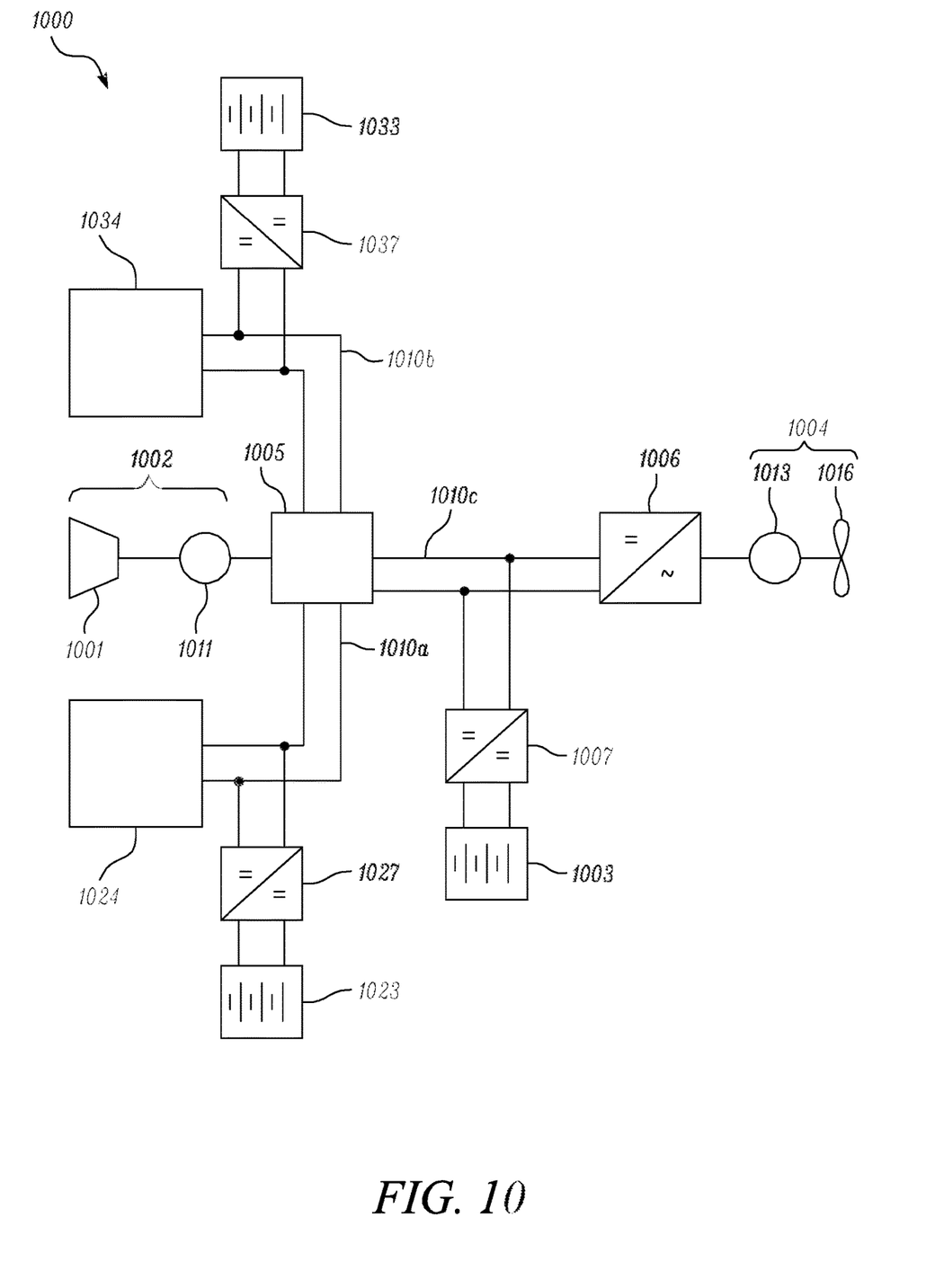
FIG. 10 is a schematic illustration of a hybrid electric aircraft propulsion system incorporating an electrical power system providing first, second and third DC output supplies from a common electrical machine.

FIG. 10

FIG. 10 schematically illustrates an example aircraft power and propulsion system 1000 comprising an electrical power system as described above. The propulsion system 1000 is similar to that described above in relation to FIG. 2, but with first, second and third DC distribution buses 1010a, 1010b, 1010c provided DC supplies by an AC:DC power electronics converter 1005. The converter 1005 may be of the type as description above in relation to FIG. 7, 8 or 9. In some examples according to FIG. 7, the system 1000 may comprise only the first (or second) DC distribution bus with the third DC distribution bus 1010c. The first and second DC distribution buses 1010a, 1010 operate a first lower voltage, for example +/−270V, while the third DC distribution bus 1010c operates at a second higher voltage, for example 540V. A generator set 1002 comprises a gas turbine engine 1001 driving an electrical machine 1011 that provides an AC supply to the AC:DC power electronics converter 1005.

The AC:DC power electronics converter 1005 provides first and second DC output supplies to the respective first and second DC distribution buses 1010a, 1010b, or in some examples to only one of the first and second DC distribution bus 1010a, 1010b. In the illustrated example each DC distribution bus 1010a, 1010b is connected to a DC:DC power electronics converter 1027, 1037 and a battery 1023, 1033. Each of the first and second DC distribution buses 1010a, 1010b is connected to a respective load 1024, 1034, which may for example comprise one or more onboard electrical systems. As described above, the power drawn by each of the loads 1024, 1034 may be dynamically adjusted to ensure that the power drawn is balanced between the loads 1024, 1034.

The AC:DC power electronics converter 1005 also provides a third DC output supply to the third DC distribution bus 1010c, which in this example is connected to a DC:DC power electronics converter 1007 and a battery 1003 and to a DC:AC power electronics converter 1006 to drive a propulsor 1004 comprising a motor 1013 and fan 1016.

The power electronics converters described herein are all capable of passing power in both directions, i.e., from the electrical machine to the DC distribution network or from the DC distribution network to the electrical machine. It is therefore possible to start the gas turbine engine electrically from one or more of the DC distribution buses as required.

Figure 11:
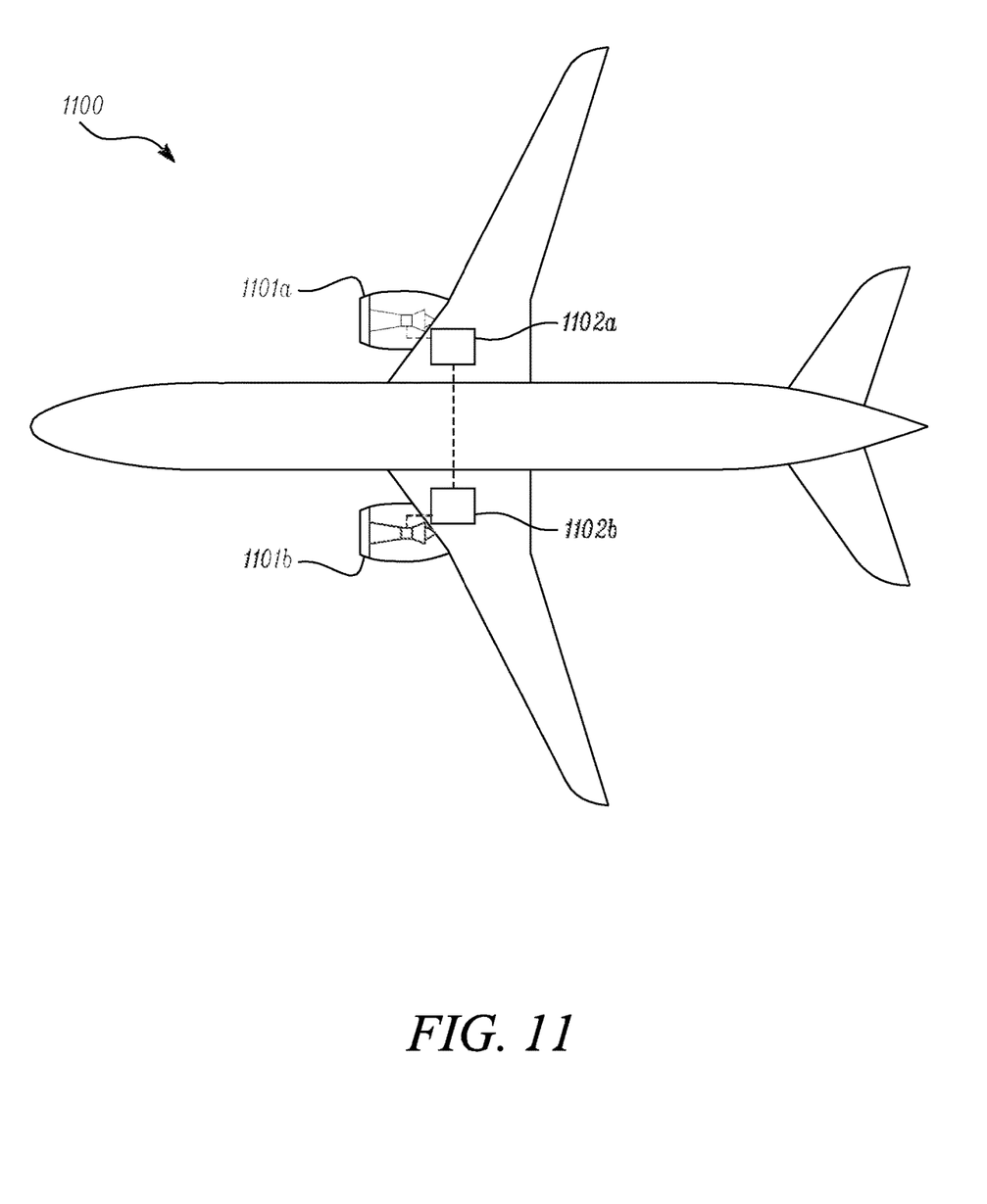
FIG. 11 is a schematic illustration of an aircraft comprising an electric power and propulsion system.

FIG. 11

As described above, the electrical power system described herein may be part of an aircraft power and propulsion system, as illustrated schematically in FIG. 11. The aircraft 1100 comprises gas turbine engines 1101a, 1101b, one or both of which may comprise or be connected to an electrical power system 1102a, 1102b of the type as described above. Each of the gas turbine engines 1101a, 1101b may be as described above in relation to FIG. 1. The aircraft 1100 may be a hybrid electric aircraft.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft propulsion systems, the electric machine drive techniques described herein could be used for many other applications. These include, but are not limited to, automotive, marine and land-based applications.

The invention claimed is:

1. An electrical power system comprising:
an electrical machine having first, second, third and fourth windings;
first, second, third and fourth AC:DC power electronics converters each connected to receive an input AC supply from the respective first, second, third and fourth windings, each AC:DC power electronics converter having first and second DC output terminals,
wherein:
first DC output terminals of the first and second AC:DC power electronics converters are connected to a first DC supply output terminal;
second DC output terminals of the first and second AC:DC power electronics converters are connected to a second DC supply output terminal;
first DC output terminals of the third and fourth AC:DC power electronics converters are connected to the second DC supply output terminal; and
second DC output terminals of the third and fourth AC:DC power electronics converters are connected to a third DC supply output terminal,
the first and second windings are arranged to provide an AC supply to the respective first and second AC:DC power electronics converters in quadrature to each other and the third and fourth windings are arranged to provide an AC supply to the respective third and fourth AC:DC power electronics converters in quadrature to each other.

2. The electrical power system of claim 1, comprising a switching controller connected to provide switching signals to each of the first, second, third and fourth AC:DC power electronics converters.

3. The electrical power system of claim 1, comprising a first DC distribution bus connected between the first and second DC supply output terminals for connection to a first DC load and a second DC distribution bus connected between the first and third DC supply output terminals for connection to a second DC load.

4. The electrical power system of claim 3, comprising a third DC distribution bus connected between the second and third DC supply output terminals for connection to a third DC load.

5. The electrical power system of claim 1, wherein the first, second third and fourth AC:DC power electronics converters are each configured as H-bridge converters.

6. The electrical power system of claim 1, wherein the first, second third and fourth AC:DC power electronics converters) are each configured to provide an output power of up to 100 kW.

7. The electrical power system of claim 1, wherein the first and second AC:DC power electronics converters are configured to provide an output power of over twice that of the third and fourth AC:DC power electronics converters.

8. The electrical power system of claim 7, wherein the first and second AC:DC power electronics converters are configured to provide an output power of three times that of the third and fourth AC:DC power electronics converters.

9. An electrical power system comprising:
  an electrical machine having first and second pluralities of windings;
  a first AC:DC power electronics converter connected to the first plurality of windings;
  a second AC:DC power electronics converter connected to the second plurality of windings;
  a switching controller configured to provide switching signals to the first and second AC:DC power electronics converters to provide a first DC output supply across first and second DC output terminals of the first AC:DC power electronics converter and a second DC output supply across first and second DC output terminals of the second AC:DC power electronics converter;
  a first DC distribution bus connected across the first and second DC output terminals of the first AC:DC power electronics converter for connection to a first DC load;
  a second DC distribution bus connected across the first and second DC output terminals of the second AC:DC power electronics converter for connection to a second DC load; and
  a third DC distribution bus connected across the first DC output terminal of the first AC:DC power electronics converter and the second DC output terminal of the second AC:DC power electronics converter for connection to a third DC load.

10. The electrical power system of claim 9, wherein the first and second AC:DC power electronics converters are each configured to provide an output power of up to 100 kW.

11. The electrical power system of claim 9, wherein the first and second pluralities of windings are provided on a common stator of the electrical machine.

12. The electrical power system of claim 9, wherein the first and second pluralities of windings each consist of three windings.

13. The electrical power system of claim 9, comprising:
  the first load connected across the first DC distribution bus;
  the second load connected across the second DC distribution bus; and
  the third load connected across the third DC distribution bus.

14. The electrical power system of claim 9, wherein the second DC output terminal of the first AC:DC power electronics converter and the first DC output terminal of the second AC:DC power electronics converter are connected to a ground terminal.

15. An aircraft power and propulsion system comprising:
  a gas turbine engine; and
  an electrical power system according to claim 1,
  wherein the electrical machine of the electrical power system is mechanically coupled with a spool of the gas turbine engine.

16. An aircraft power and propulsion system comprising:
  a gas turbine engine; and
  an electrical power system according to claim 9,
  wherein the electrical machine of the electrical power system is mechanically coupled with a spool of the gas turbine engine.

17. An aircraft comprising the power and propulsion system of claim 15.

18. The aircraft of claim 17, wherein the aircraft is a hybrid electric aircraft.

19. An aircraft comprising the power and propulsion system of claim 16.

20. The aircraft of claim 19, wherein the aircraft is a hybrid electric aircraft.

* * * * *